United States Patent [19]

Roselt et al.

[11] Patent Number: 4,514,206

[45] Date of Patent: Apr. 30, 1985

[54] METHOD FOR THE PRODUCTION OF A TRANSVERSE CORRUGATED OR SERRATED INTERIOR PIPE OF A DOUBLE-WALLED SPECIAL GAS DISCHARGE PIPE WITH HIGH ANGLE SELECTIVITY

[75] Inventors: Udo Roselt, Lobeda-Ost; Lothar Nolte, Jena; Manfred Pöhler, Halle-Neustadt, all of German Democratic Rep.

[73] Assignee: VEB Kombinat Feinmechanische Werke Halle, Halle, German Democratic Rep.

[21] Appl. No.: 573,895

[22] Filed: Jan. 5, 1984

[30] Foreign Application Priority Data

Apr. 11, 1983 [DD] German Democratic Rep. ... 249730

[51] Int. Cl.³ .................. C03B 23/04; B29C 17/07
[52] U.S. Cl. .......................... 65/108; 29/447; 65/102; 65/110; 264/332; 264/516
[58] Field of Search .................. 65/102, 108, 109, 110; 29/447; 264/516, 332

[56] References Cited

U.S. PATENT DOCUMENTS 2,735,230  2/1956  Morrill ............................. 65/110 X
2,772,939  12/1956  Laico ................................ 65/110 X
2,822,501  2/1958  Poulter ............................. 65/110 X
3,849,531  11/1974  Mefferd ............................ 264/516

*Primary Examiner*—Robert Lindsay
*Attorney, Agent, or Firm*—Jordan and Hamburg

[57] ABSTRACT

A method and apparatus for the production of a transversely corrugated or serrated interior pipe of a double walled special gas discharge pipe with high angle selectivity, especially to the production of such pipe from silicate materials, preferably for $CO_2$ laser with axial gas discharge with high amplification, the method and apparatus providing for the economic production of such pipes from silicate materials, with defined sharp-edged corrugations, in the required accuracy and quality. This is accomplished by forming an interior pipe from a smooth cylindrical glass pipe, which has been heated by means of suitable heat sources, until the material can be plastically formed. For this, an inner transformation tool, into the outer jacket of which the corrugated form required for the interior pipe has worked in, is used, as well as an outer transformation tool, the outer jacket of which has at least two corrugations with a design which is complementary to the inner transformation tool, with the inner transformation tool being fixed, while the pipe to be transformed is displaced in a slow rotary movement, and with the outer transformation tool being pressed against the outer jacket following the heating of the pipe segment to be transformed, so that the required corrugation is formed. The transformation process proceeds so that always at least one corrugation of the outer transformation tool is guided in the corrugation formed during the respective preceding working step, when forming the respective next corrugation. In an alternative embodiment, the inner transformation tool is vertically displaceable and the pipe is stationary, the tool being mounted to a longitudinally extending shaft, so that the tool cooperates with the outer transformation tool by vertically upwards displacement of the inner tool.

20 Claims, 4 Drawing Figures (A-A)

(B-B)

METHOD FOR THE PRODUCTION OF A TRANSVERSE CORRUGATED OR SERRATED INTERIOR PIPE OF A DOUBLE-WALLED SPECIAL GAS DISCHARGE PIPE WITH HIGH ANGLE SELECTIVITY

BACKGROUND OF THE INVENTION AND PRIOR ART STATEMENT

The invention relates to a method with accompanying apparatus for the production of a transversely corrugated or serrated interior pipe of a double-walled special gas discharge pipe with high angle selectivity made from silicate materials, preferably for $CO_2$ lasers with maximal gas discharge with high amplification.

Because of its many advantages, silicate is the preferred material for gas discharge pipes in gas lasers. Due to the high demands, which have to be placed on gas discharge pipes as regards accuracy and selected design, extensive, complicated and thus expensive manufacture and conversion methods have to be employed for the manufacture of silicate materials. Known methods are the injection and catapult methods, the transformation-pressing method as well as the KPC method. The latter even allows for manufacture and design variations, being in the range of one hundredth part millimeters. The rapid and dynamic development of the laser techniques requires special, double-walled gas discharge pipes with high angle selectivity, with a multitude of sharp-edged creases or ribs in the interior wall of the interior pipe, running diagonal to the longitudinal axis of the interior pipe. Such pipes, having the required quality and accuracy, can only be produced by common methods with unjustifiably high expenditures, which has markedly hampered the development of the laser techniques in this area.

SUMMARY OF THE INVENTION

It is an object of the invention to provide a method for the production of a transversely corrugated or serrated interior pipe of a double-walled special gas discharge pipe with high angle selectivity, with accompanying apparatus, which enables the economical manufacture of such pipes from silicate materials, thus creating an essential pre-requisite for the development of novel laser systems with considerably expanded application possibilities.

It is another object of the invention to provide a method, together with the accompanying apparatus, for the production of a transversely corrugated or serrated interior pipe of a double-walled special gas discharge pipe with high angle selectivity, enabling the production of such pipes from silicate materials, preferably rasotherm glass or quartz glass, with defined sharp-edged creases or ribs in the interior upper surface of the interior pipe, and with the required accuracy and quality.

A further object of the invention is to provide a method and apparatus for the economic production of such pipes from silicate materials with defined sharp-edged corrugations, in the required accuracy and quality.

These and other objects and advantages of the present invention will become evident from the description which follows.

In the invention, the objects are accomplished by a method, in which the interior pipe of the double-walled special gas discharge pipes with high angle selectivity is formed from a smooth, cylindrical pipe of silicate material, preferably rasotherm or quartz glass, and heated by means of suitable heat sources, preferably gas burners, to a point at which the material can be plastically formed.

Rasotherm, as commonly understood, is defined as the trademark for a temperature change resistant borosilicate glass, with very low coefficient of expansion, resistant against temperature changes, water and acids; used for chemical utensils and the like, and named after Rasorit, which is a trademark for a borax resembling mineral, which corresponds to Kernite. See, e.g., Kraus and Hunt, Mineralogy, 1928, page 303, 380; Reiberger, in Glass-, Enamel- Ceramic-Techniques 1955, pages 110–112; Ullman IV, 586, 593. A literature reference to Rasotherm glass appears in Urania 1959, page 407 (Regler, H.).

The following process steps are employed:

Preparing the transformation process by inserting an inner transformation tool, preferably assembled from several parts, and sprayed with an anti-adhesive means, into the initially still smooth glass pipe, which is to be transformed, with the corrugated form required for the interior pipe of the special gas discharge pipe being worked into the outer jacket of the inner transformation tool, and measured, so that the outer jacket is located adjacent to the interior wall of the glass pipe to be transformed in so-called clearance fit;

Clamping the glass pipe, which is to be transformed, with the inner interior transformation tool, for example, into a glass blower lathe, so that the inner transformation tool is fixed, and the glass pipe to be transformed performs a rotatory movement around its axis;

Heating the glass pipe to be transformed at one end, beginning in the area of the first corrugation to be made, to transformation temperature;

Forming of at least the first two corrugations by means of an outer transformation tool with circular cross-section, made from a suitable material, for example graphite, arranged parallel to the axis of rotation in a displaceable and tiltable fashion, and not driven, with its outer jacket having at least two corrugations, with a design which complements the inner transformation tool, with the outer transformation tool being moderately pressed against the wall of the glass pipe to be transformed, so that this is placed into rotatory motion, as well, by the resulting static friction, and engages into the corresponding recesses of the inner transformation tool.

Transformation of the entire glass pipe, so that, following corresponding heating of the pipe jacket in the respective area of the corrugation to be next formed to transformation temperature, the outer transformation tool is always displaced by one corrugation in the working direction, so that always at least one corrugation of the outer transformation tool is guided in the corrugation formed during the respective preceding working process, for the formation of the respective next corrugation of the glass pipe to be transformed, with the glass pipe to be transformed being kept at a virtually constant temperature in the area of the already formed corrugation during the entire process, in which the inner transformation tool is still present, the temperature being insignificantly below the transformation temperature of the respective material used, and with the inner transformation tool being dismounted and removed from the pipe following the transformation at this temperature, so that the finished interior pipe of the special gas discharge pipe can be cooled free of tension, in a way which is in itself already known.

The apparatus for the execution of the method in the invention has two simultaneously rotating lathe chucks for the clamping and rotating of the glass pipes to be transformed, two center points for the mounting of the inner transformation tool, as well as suitable heat sources for the heating of the glass pipes to be transformed to transformation temperatures. The inner transformation tool has a circular cross-section with laterally secant-shaped, perpendicularly running levelings, the lateral distance of which to the wall of the glass pipes to be transformed being approximately ⅓ of the pipe radius at the height of center. For the mounting and dismounting, the inner transformation tool has at least three longitudinal parts, connected to one another by suitable detachable connections, for example, screw connections, a middle part with rectangular or square cross-section, as well as an upper and lower part, into the remaining circular outer jackets of which, the corrugated form is worked in, as required for the interior pipe of the special gas discharge pipes. The inner transformation tool is brought in its assembled state, for the formation over the entire length into the glass pipe to be transformed, and clamped by means of the center points, so that it remains fixed during the entire process, being symmetrically adjacent to the corresponding circular segments of the interior wall of the glass pipes to be transformed, with its corrugated outer jackets in so-called clearance fit above and below the axis of the pipe. Having finished the transformation process, according to the invention, the screw connections are detached, first the middle part is pulled out, and then the upper and lower parts lowered and raised until they are released from the formed corrugations in the finished interior pipe, as seen in the direction of the axis, and pulled out as well.

The outer transformation tool for the execution of the method in the invention, which is rotatably mounted and not driven, has a circular cross-section, and its outer jacket has at least two corrugations, with a design which complements the inner transformation tool. It is arranged via a suitable holder, so that it can be displaced over a sliding axis, parallel to the axis of the clamped glass pipe to be transformed, and pressed manually against the outer jacket of the glass pipe to be transformed, by a pressing lever.

In a preferred embodiment, a fixed, one-part inner transformation tool can be used as well. This one-part transformation tool is rigidly mounted on a shaft, which has in turn been clamped by center points, displaceable in the longitudinal direction and not rotating, being displaceable with these, parallel and synchronously with the outer transformation tool. In the outer jacket of this one-part inner transformation tool, at least two corrugations are worked into the corrugated form required for the interior pipe of the special gas discharge pipe, so that the outer jacket is symmetrically adjacent to a circular segment of the interior wall of the glass pipe to be transformed above the axis of the pipe, in an area which approximately corresponds to its radius. When executing the method in the invention, the one-part inner transformation tool is brought into the glass pipes to be transformed and clamped by the already mentioned clamping elements, with the shaft with the one-part inner transformation tool being lowered to a degree which is somewhat greater than the depth of the corrugations to be formed, and with the first two corrugations having been formed in the already described form, the shaft with the one-part inner transformation tool being lowered by the mentioned amount, and with the outer transformation tool being displaced in the working direction, corresponding to the amount of one corrugation, and raised again, so that always at least one corrugation of the one-part inner transformation tool engages into the respective corrugation formed during the preceding work step, when forming the respective next corrugation.

The invention accordingly consists in the method and apparatus for the production of a transversely corrugated or serrated interior pipe, of a double-walled special gas discharge pipe, with high angle selectivity, as described supra, and as will appear infra from the description of the appended drawings and preferred embodiments, and as elucidated in the present claims.

BRIEF DESCRIPTION OF THE DRAWINGS

The invention will be explained by means of two embodiments. The corresponding drawings show.

DETAILED DESCRIPTION OF THE PREFERRED EMBODIMENTS

Figure 1:
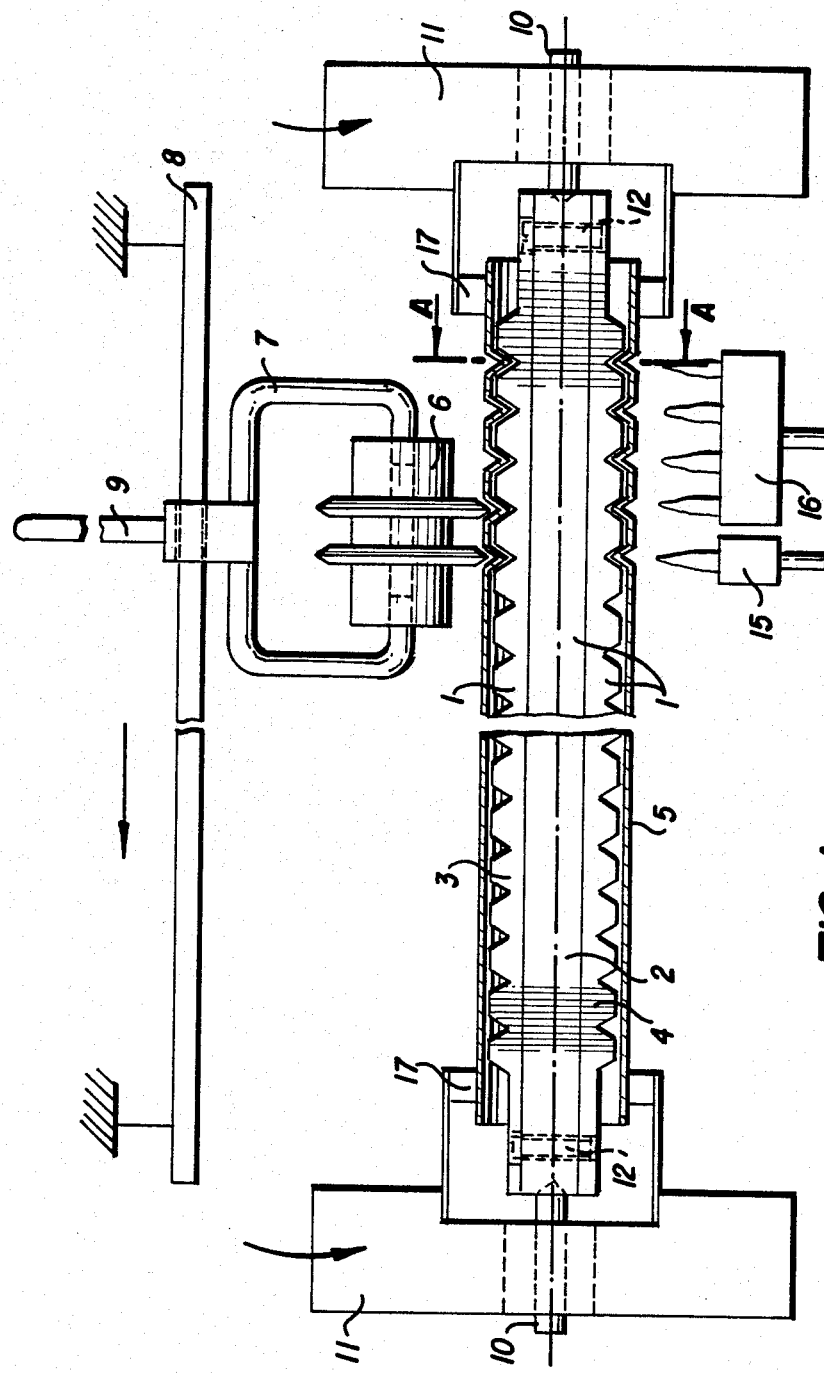
FIG. 1 is the front elevation of the apparatus for the execution of the method in the invention.

Following is a reference glossary of elements and members as employed in the present invention.

GLOSSARY

1. Inner transformation tool
2. Middle part of the inner transformation tool
3. Upper part of the inner transformation tool
4. Lower part of the inner transformation tool
5. Glass pipe to be transformed
6. Outer transformation tool
7. Holder for the outer transformation tool
8. Sliding axis for the outer transformation tool
9. Pressure lever
10. Center points for the mounting of the inner transformation tool
11. Chuck lathe for the clamping of the glass pipe to be transformed
12. Screw connection
13. One-part inner transformation tool
14. Shaft
15. First gas burner
16. Multi-frame box burner
17. Clamp of the chuck lathe
18. Longitudinally displaceable center points, which can be lowered Referring now to the drawings, the apparatus for the execution of the method according to the invention consists of two simultaneously rotating lathe chucks 11 for the clamping and rotating of the glass pipe 5 to be transformed, center points 10 for the fixed clamping of the inner transformation tool 1, as well as accompanying heat sources, a first gas burner 15 and a multiple box burner 16 for the heating of the glass pipe 5 to be transformed to the respective required working temperature. The pipe 5 to be transformed, made of rasotherm glass, is clamped into the two simultaneously rotating lathe chucks 11, or a glass blower's lathe, by means of suitable clamps 17 grasping it at both ends. The inner transformation tool 1, consisting of a special steel alloy, is sprayed with an antiadhesive means and located in the interior of the glass pipe 5 to be transformed. This inner transformation tool 1 is securely clamped between centered, non-rotating points 10, located in the center of the two lathes 11. It has the corrugated form, required for the interior pipe 5 of the special gas discharge pipes, on the jacket surface adjacent to the interior wall of the glass pipe 5 to be transformed. The outer transformation tool 6, made from graphite, is displaceably and tiltably arranged parallel to the axis of rotation of the pipe 5 to be transformed, so that it can be pressed onto the circumference of the pipe 5 to be transformed with moderate pressure, and as a consequence of the resulting static friction, performs a forced rotatory movement around its axis of rotation. Its outer jacket has two corrugations with a design which is complementary to the inner transformation tool 1. For the transformation, the slowly rotating glass pipe 5 is brought to a sufficiently high temperature by means of the first gas burner 15, such that it can be plastically formed. Having reached the required transformation temperature, the first two corrugations are formed at the circumference of the pipe by means of the outer transformation tool 6, by varying the pressure. Having completed these first two corrugations, the outer transformation tool 6 is lifted out of the corrugations, and pushed in the working direction by a total distance of one corrugation. By means of the multiple flame box burner 16, the initially formed corrugation, as well as the inner transformation tool in the area of this first corrugation, are kept at a set high temperature, which is slightly below the transformation range of the rasotherm glass. In the area of the next (third) corrugation, the rasotherm glass is heated by means of the first gas burner 15 to that temperature at which it can be plastically formed. By means of the outer transformation tool 6, the next corrugation is formed in the already mentioned form, with the rear corrugation of the outer transformation tool 6, as seen in the working direction, engaging into the second corrugation formed during the preceding working process, and guided in this. The production of the fourth and all subsequent corrugations is analogous. The glass pipe 5 to be transformed, as well as the inner transformation tool 1 in the area of the already formed corrugation, are kept during the entire process at the already mentioned temperature, below the transformation range of the rasotherm glass. Having completed the transformation, the inner transformation tool 1 is dismounted and removed from the glass pipe, so that the finished interior pipe 5 can be cooled in a well-known tension-free fashion.

Figure 2:
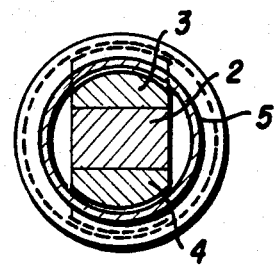
FIG. 2 is a sectional elevation cross-section through a 3-part inner transformation tool, with the glass pipe to be transformed, taken substantially along the line A—A of FIG. 1.
Figure 3:
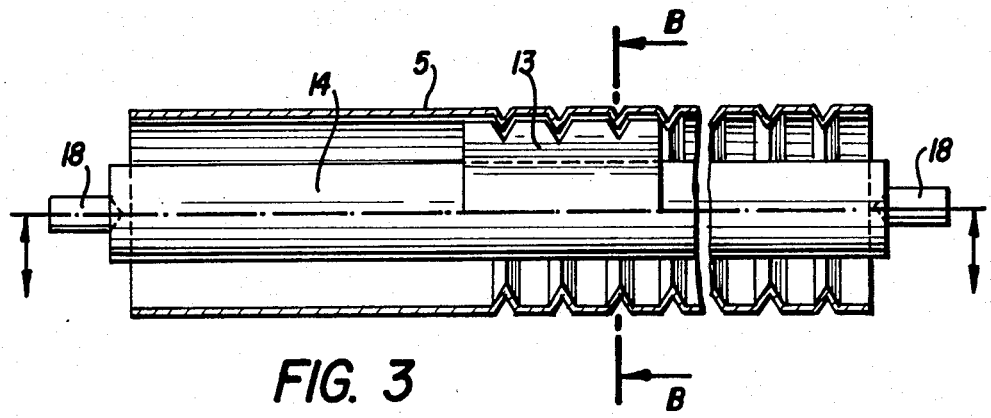
FIG. 3 is a front elevation cross-section through a one-part inner transformation tool, with the glass pipe to be transformed.
Figure 4:
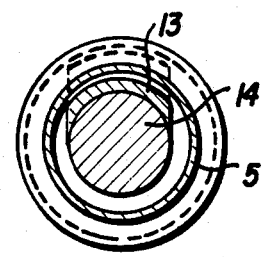
FIG. 4 is a sectional elevation cross section of the one-part inner transformation tool, with the glass pipe to be transformed of FIG. 3, taken substantially along the line B—B of FIG. 3.

The inner transformation tool 1 is formed from three longitudinal parts, connected by a screw connection 12, as illustrated in FIG. 2. The tool includes a middle part 2 with rectangular cross-section, as well as the upper and lower part 3;4, into the circular outer jacket of which the corrugated form required for the interior pipe 5 of the special gas discharge pipe is worked. In an assembled state, the inner transformation tool 1 has a circular cross-section, with the sides being leveled perpendicularly in a secant-shaped fashion, with the lateral distance of the leveling to the wall of the glass pipe 5 to be transformed being approximately ⅓ of the pipe radius at the center height. For the transformation, the inner transformation tool 1 is brought across the entire length in the glass pipe 5 to be transformed, and clamped by means of a non-rotating center point 10, so that it is symmetrically adjacent to the corresponding circular segments of the interior wall of the glass pipe 5 to be transformed, with its corrugated outer jacket in so-called clearance fit, above and below the axis of the pipe. Having completed the transformation process, the screw connections 12 are released, at first the middle part 2 is pulled out, and then the upper and lower part 3;4 lowered or raised, until they are released, as seen, in the axial direction, from the formed corrugations of the finished pipe, and removed as well.

The one-part inner transformation tool 13 is rigidly arranged on a shaft 14, which in turn is mounted by center points 18, which are longitudinally displaceable, non-rotating, and which can be lowered. The shaft 14 with the one-part inner transformation tool 13 can be lowered by means of the center points 18, by an amount which is somewhat larger than the depth of the corrugation to be formed. The corrugation form, required for the interior pipe 5 of the special gas discharge pipe, is formed in the outer jacket of the one-part inner transformation tool 13. When transforming the glass pipe 5 according to the method in the invention, the one-part inner transformation tool 13 is inserted into the glass pipe 5, so that its outer jacket is symmetrically adjacent to a circular segment on the inner wall of the glass pipe 5 to be transformed, above the axis of the pipe, in an area which approximately corresponds to its radius. Having formed the corrugations in the already described form, the shaft 14 with the one-part inner transformation tool 13 is lowered by the mentioned amount, displaced together with the outer transformation tool 6, by the amount of one corrugation in the working direction, and raised again, so that the rear corrugation of the one-part transformation tool 13, as seen in the working direction, engages into the corrugation formed during the preceding work process, when forming the respective next corrugation.

It thus will be seen that there is provided a method and apparatus for the production of a transversely corrugated or serrated interior pipe of a double-walled special gas discharge pipe with high angle selectivity, which attains the various objects of the invention, and which is well adapted for the conditions of practical use. As numerous alternatives and equivalents within the scope of the present invention will occur to those skilled in the art, besides those alternatives equivalents, variations and modifications mentioned supra, it will be understood that the invention extends fully to all such equivalents, alternatives or the like, and is to be limited only by the scope of the recitations in the appended claims, and functional and structural equivalents thereof.

We claim:

1. A method for the production of a substantially transversely deformed cylindrical pipe which comprises:
   (a) providing a smooth-walled substantially rectilinear cylindrical pipe, said pipe being principally composed of a thermoplastic solid material;

(b) providing a first transformation tool, said first tool having a substantially rectilinear central shaft and a one-part transformation tool element, said one-part tool element being mounted to a portion of the outer surface of said central shaft, and being provided with a plurality of parallel substantially identical external recesses in its outer surface, said first tool being configured so as to fit within said pipe and extend longitudinally therethrough with a substantial clearance fit;

(c) inserting said first tool longitudinally into said pipe, so that said central shaft and said pipe are substantially coaxial, with said pipe being concentrically disposed about said central shaft and contiguously external to said one-part tool element;

(d) centrally mounting the opposed ends of said central shaft on first support elements, so that said first tool is rigidly and fixedly mounted on said first support elements, whereby said first tool is stationary, said first support elements being both longitudinally and transversely displaceable, said first tool being detachably mounted to said first support elements;

(d) mounting the opposed ends of said pipe on second support elements said second support elements being rotatable about the central longitudinal axis of said pipe, said pipe being detachably mounted to said second support elements;

(f) providing a second transformation tool, said second tool being external to and juxtaposed with said pipe, and aligned opposite to said one-part tool element, said second tool having a plurality of substantially circular and rotatable coaxially aligned dependent solid transformation elements, said circular transformation elements being substantially identical and of the same size with equal diameters, said elements being spaced apart and juxtaposed in registration, and being dependent from third support elements, so that said circular transformation elements are oriented substantially perpendicular to said pipe and are displaceable into contact with or spaced away from said pipe, and alternately displaceable parallel to the axis of said pipe when spaced away from said pipe, the spacing between adjacent pairs of circular transformation elements being substantially equal to the spacing between adjacent pairs of the external recesses in said one-part tool element, with the common central axis of said juxtaposed circular transformation elements being parallel to the longitudinal axis of said pipe, the perimeters of said circular transformation elements being configured so as to complement said external recesses in said one-part tool element;

(g) rotating said pipe about its central longitudinal axis, and about said stationary first tool;

(h) externally heating a first portion of said pipe during step (g), so that said first pipe portion becomes plastic and deformable, said first pipe portion being aligned with both said second tool and said one-part tool element;

(i) displacing said second tool towards said first pipe portion during step (h), so that each of said circular transformation elements extends into one of said external recesses in said one-part tool element and is pressed against said first pipe portion, and is rotated by static friction with the external surface of said first pipe portion, whereby said first pipe portion is transversely deformed, thereby forming a plurality of parallel substantially identical recesses in said first pipe portion;

(j) displacing said second tool away from said first pipe portion, and thereafter to a subsequent position in which said second tool is juxtaposed with a second pipe portion immediately adjacent to said first pipe portion;

(k) displacing said first tool transversely away from said first pipe portion, so that clearance is provided between said recesses in said first pipe portion and said one-part tool element, and thereafter both longitudinally followed by transversely, to a subsequent position in which said one-part tool element is contiguously juxtaposed with said second pipe portion;

(l) maintaining the heating of said first pipe portion;

(m) externally heating said second pipe portion, while maintaining the rotation movement of said pipe according to step (g), so that said second pipe portion becomes plastic and deformable;

(n) displacing said second tool towards said second pipe portion during step (m), so that each of said circular transformation elements extends into one of said external recesses in said one-part tool element and is pressed against said second pipe portion, and is rotated by static friction with the external surface of said second pipe portion, and concomitantly guiding at least one of said circular transformation elements into one of the recesses previously formed in said first pipe portion according to step (i), and whereby said second pipe portion is transversely deformed, thereby forming at least one recess in said second pipe portion, said one recess being, parallel to and substantially identical with said recesses previously formed in said first pipe portion according to step (i);

(o) maintaining the heating of said first and second pipe portions, and any subsequent deformed pipe portions, which have been subsequently deformed seriatim, to form the requisite number of parallel and substantially identical recesses in and along said pipe;

(p) thereafter displacing said second transformation tool away from said pipe;

(q) terminating the heating of said pipe;

(r) subsequently removing said first transformation tool from within said pipe, thereby permitting the completed and substantially transversely deformed cylindrical pipe to cool in a tension-free environment; and (s) removing said pipe from said second support elements, thereby recovering a product substantially transversely deformed cylindrical pipe having a plurality of spaced-apart parallel and substantially identical recesses in and along its length.

2. The method of claim 1, in which the thermoplastic solid material is a glass selected from the group consisting of rasotherm glass and quartz glass.

3. The method of claim 1, in which the circular transformation elements are principally composed of graphite.

4. A method for the production of a substantially transversely deformed cylindrical pipe which comprises:
(a) providing a smooth-walled substantially rectilinear cylindrical pipe, said pipe being principally composed of a thermoplastic solid material;

(b) providing a substantially rectilinear first transformation tool, said first tool having a plurality of parallel substantially identical external recesses in its outer surface, said tool being configured so as to fit within said pipe and extend longitudinally therethrough with a contiguous clearance fit;

(c) inserting said first tool longitudinally into said pipe, so that said first tool and said pipe are coaxial, with said pipe being concentrically disposed external to and about said first tool;

(d) centrally mounting the opposed ends of said first tool on first support elements so that said first tool is rigidly and fixedly mounted on said support elements, whereby said first tool is stationary, said first tool being detachably mounted to said first support elements;

(e) mounting the opposed ends of said pipe on second support elements, said second support elements being rotatable about the central longitudinal axis of said pipe, said pipe being detachably mounted to said second support elements;

(f) providing a second transformation tool, said second tool being external to and juxtaposed with said pipe, said second tool having a plurality of substantially circular and rotatable coaxially aligned dependent solid transformation elements, said circular transformation elements being substantially identical and of the same size with equal diameters, said elements being spaced apart and juxtaposed in registration, and being dependent from third support elements, so that said circular transformation elements are oriented substantially perpendicular to said pipe and are displaceable into contact with or spaced away from said pipe, and alternately displaceable parallel to the axis of said pipe when spaced away from said pipe, the spacing between adjacent pairs of circular transformation elements being substantially equal to the spacing between adjacent pairs of the external recesses in said first tool, with the common central axis of said juxtaposed circular transformation elements being parallel to the longitudinal axis of said pipe, the perimeters of said circular transformation elements being configured so as to complement said external recesses in said first tool;

(g) rotating said pipe about its central longitudinal axis, and about said stationary first tool;

(h) externally heating a first portion of said pipe during step (g), so that said first pipe portion becomes plastic and deformable;

(i) displacing said second tool towards said first pipe portion during step (h), so that each of said circular transformation elements extends into one of said external recesses in said first tool and is pressed against said first pipe portion, and is rotated by static friction with the external surface of said first pipe portion, whereby said first pipe portion is transversely deformed, thereby forming a plurality of parallel substantially identical recesses in said first pipe portion;

(j) displacing said second tool away from said first pipe portion, and thereafter to a subsequent position in which said second tool is juxtaposed with a second pipe portion immediately adjacent to said first pipe portion;

(k) maintaining the heating of said first pipe portion;

(l) externally heating said second pipe portion, while maintaining the rotation movement of said pipe according to step (g), so that said second pipe portion becomes plastic and deformable;

(m) displacing said second tool towards said second pipe portion during step (l), so that each of said circular transformation elements extends into one of said external recesses in said first tool and is pressed against said second pipe portion, and is rotated by static friction with the external surface of said second pipe portion, and concomitantly guiding at least one of said circular transformation elements into one of the recesses previously formed in said first pipe portion according to step (i), and whereby said second pipe portion is transversely deformed, thereby forming at least one recess in said second pipe portion, said one recess being parallel to and substantially identical with said recesses previously formed in said first pipe portion according to step (i);

(n) maintaining the heating of said first and second pipe portions, and any subsequent deformed pipe portions, which have been subsequently deformed seriatim, to form the requisite member of parallel and substantially identical recesses in and along said pipe;

(o) thereafter displacing said second transformation tool away from said pipe;

(p) terminating the heating of said pipe;

(q) subsequently removing said first transformation tool from within said pipe, thereby permitting the completed and substantially transversely deformed cylindrical pipe to cool in a tension-free environment; and (r) removing said pipe from said second support elements, thereby recovering a product substantially transversely deformed cylindrical pipe having a plurality of spaced-apart parallel and substantially identical recesses in and along its length.

5. The method of claim 4, in which the thermoplastic solid material of step (a) is silicate material.

6. The method of claim 4, in which the thermoplastic solid material is a glass.

7. The method of claim 6, in which the glass is a glass selected from the group consisting of rasotherm glass and quartz glass.

8. The method of claim 4, in which the first transformation tool of step (b) is generally composed of three separate, parallel and longitudinally extending and detachably attached elements, aligned contiguously and in registration, and comprising a first central element of substantially rectangular cross-section, and second and third outer elements, said outer elements straddling said first element, the outer face of each of said outer elements being curved and being provided with said external recesses, the inner face of each of said outer elements being flat and juxtaposed with one face of two opposite faces of said first central substantially rectangular element.

9. The method of claim 8, in which the cross-section of the first central element is substantially square.

10. The method of claim 4, in which the first tool has a circular cross-section with two laterally opposed secant-shaped, perpendicularly running levelings, the lateral distance of said levelings to the inner surface of the pipe being about ⅛ of the radius of the pipe at the center height.

11. The method of claim 4, in which the first tool is composed of alloy steel.

12. The method of claim 4, including the spraying of the first tool with an anti-adhesive composition, prior to step (c).

13. The method of claim 4, in which the second support elements are clamps of a chuck lathe or a glass blower's lathe.

14. The method of claim 4, in which the circular transformation elements are principally composed of graphite.

15. The method of claim 4, in which the number of circular transformation elements is two.

16. The method of claim 4, in which the circular transformation elements are mounted to a holder, said holder depending from a pressure lever element, said pressure lever element depending from, and being laterally displaceable along, a rigidly fixed and substantially rectilinear sliding axis element, the axis of said sliding axis element being parallel to the longitudinal axis of the pipe.

17. The method of claim 4, in which the pipe is externally heated by the combustion of gas adjacent the pipe, a first stage of heating being by means of a first single gas burner, followed by a multi-flame box burner.

18. The method of claim 4, in which the external recesses in the first tool, and the perimeters of the circular transformation elements, have an angular configuration, so that the plurality of recesses in the product pipe of step (r) are spaced-apart angular grooves.

19. The method of claim 4, in which the product pipe of step (r) is corrugated or serrated, said product pipe having accurately defined sharp-edged creases or ribs in its interior surface, so that said product pipe has high angle selectivity.

20. The method of claim 1, in which the product pipe of step (s) is corrugated or serrated, said product pipe having accurately defined sharp-edged creases or ribs in its interior surface, so that said product pipe has high angle selectivity.

* * * * *